(12) United States Patent
Cheng

(10) Patent No.: US 6,717,920 B1
(45) Date of Patent: *Apr. 6, 2004

(54) DYNAMICALLY CREATED SERVICE CLASS-BASED ROUTING TABLES

(75) Inventor: Dean Cheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/342,654

(22) Filed: Jan. 14, 2003

Related U.S. Application Data

(63) Continuation of application No. 09/107,038, filed on Jun. 29, 1998, now Pat. No. 6,563,798.

(51) Int. Cl.[7] .............................................. H04L 12/28
(52) U.S. Cl. .................................. 370/255; 370/395.1
(58) Field of Search ................................. 370/395, 230, 370/216, 225–8, 238, 252, 351, 389, 254–6; 709/223, 224, 238, 239–41, 242; 711/221; 379/272, 273, 219–21

(56) References Cited

U.S. PATENT DOCUMENTS

| 4,466,060 A | 8/1984 | Riddle |
| 4,905,233 A | 2/1990 | Cain et al. |
| 5,115,495 A | 5/1992 | Tsuchiya et al. |
| 5,253,248 A | 10/1993 | Dravida et al. |
| 5,274,643 A | 12/1993 | Fisk |
| 5,313,454 A | 5/1994 | Bustini et al. |
| 5,317,562 A | 5/1994 | Nardin et al. |
| 5,649,108 A | 7/1997 | Spiegel et al. |
| 5,805,593 A | 9/1998 | Busche |
| 5,844,887 A | 12/1998 | Oren et al. |
| 5,903,559 A | 5/1999 | Acharya et al. |
| 5,948,069 A | 9/1999 | Kitai et al. |
| 5,991,272 A | 11/1999 | Key et al. |
| 5,991,295 A | 11/1999 | Tout et al. |
| 5,995,503 A | 11/1999 | Crawley et al. |
| 6,026,077 A | 2/2000 | Iwata |
| 6,041,059 A | 3/2000 | Joffe et al. |
| 6,067,298 A | 5/2000 | Shinohara |

(List continued on next page.)

OTHER PUBLICATIONS

Stevens, Richard, W., "TCP/IP Illustrated," Addison Wesley, vol. 1, pp. 127–141 (1994).

Alles, Anthony, "ATM Internetworking," pp. 1–58, (May 1995).

Lee, Whay C., Hluchyi, Michael G., and Humblet, Pierre A., "Routing Subject to Quality of Service Constraints in Integrated Communication Networks," IEEE Network, pp. 46–55, (Jul./Aug. 1995).

(List continued on next page.)

Primary Examiner—David Vincent
(74) Attorney, Agent, or Firm—Blakely, Sokoloff, Taylor & Zafman LLP

(57) ABSTRACT

Dynamically created routing table structures which may find application as routing tables for ATM or other computer networks provide a selection of pre-computed routes optimized to a specified constraint such as delay and delay variation (e.g., as measured by CTD and CDV), or administrative weight (AW). The routing tables may be implemented as shortest path trees, e.g., as may be generated by a Dijkstra process, which represent the computed routes within the network, optimized to a specified constraint for one or more specified network service categories. Thus, the routing tables allow for rapid compilation of one or more source-computed routes (e.g., DTLs in an ATM network). In some cases, the routing tables may include alternate routes between network nodes. Any number of tables, between a minimum of three and a maximum of ten, may be created.

26 Claims, 2 Drawing Sheets

U.S. PATENT DOCUMENTS

| | | | |
|---|---|---|---|
| 6,094,687 | A | 7/2000 | Drake, Jr. et al. |
| 6,097,722 | A | 8/2000 | Graham et al. |
| 6,104,701 | A | 8/2000 | Avargues et al. |
| 6,122,272 | A | 9/2000 | Tomaszewski et al. |
| 6,141,325 | A | 10/2000 | Gerstel |
| 6,144,661 | A | 11/2000 | Katsube et al. |
| 6,201,810 | B1 | 3/2001 | Masuda et al. |
| 6,202,082 | B1 | 3/2001 | Tomizawa et al. |
| 6,256,309 | B1 | 7/2001 | Daley et al. |
| 6,304,549 | B1 | 10/2001 | Srinivasan et al. |
| 6,529,498 | B1 | 3/2003 | Cheng |
| 6,563,798 | B1 * | 5/2003 | Cheng ........................ 370/255 |
| 6,600,724 | B1 | 7/2003 | Cheng |

OTHER PUBLICATIONS

"ATM Forum 94–0471R12, " Appendix H: Route Generation Algorithm, pp. 256–263 (prior to Feb. 1996).

ATM–Forum_95–0099," A Sample Algorithm for Route Generation," ATM Forum Technical Committee PNNI Subworking Group, pp. 1–7 (Jan. 26, 1995).

Stallings, William, "ISDN and Broadband ISDN with Frame Relay and ATM," p. 463, (1989).

Traffic Management Specfication v4.0, The ATM Forum Technical Committee (Apr. 1996).

Addendum to Traffic Management v4.0 for ABR Parameter Negotiation, The ATM Forum Technical Committee (Jan. 1997).

The ATM Forum Technical Committee, "Integrated Local Management Interface (ILMI) Specification, Version 4.0," ATM Forum document number af–ilmi–0065–000, Sep. 1996.

The ATM Forum Technical Committee, "ATM User–Network Interface (UNI) Signalling Specification, Version 4.0," ATM Forum document No. af–sig–0061.000, Jul. 1996.

"Addendum to UNI Signalling v4.0 for ABR Parameter Negotiation," The ATM Forum Technical Committee (Jan. 1997).

The ATM Forum, "ATM User–Network Interface, Version 3.1 (UNI 3.1) Specification," Draft of May 28, 1994.

The ATM Forum Technical Committee, "Private–Network–Network Interface Specification Version 1.0 Addendum (Soft PVC MIB)," ATM Forum document No. af–p-nni–0066.000, Sep. 1996.

The ATM Forum Technical Committee, "Private–Network–Network Interface Specification Version 1.0 (PNNI 1.0)," ATM Forum document No. af–pnni–0055.000, Mar. 1996.

Radia Perlman, "Interconnection: Bridges and Routers," Addison–Wesley, pp. 230–231, 1992.

Sedgewick, R., "Algorithms in C++," Addison–Wesley, pp. 454–458, 1992.

Turner, J.S., "New Directions in Communications (or Which Way to the Information Age?)," IEEE Communications Magazine, vol. 24, No. 10, Oct. 1995.

Dickie, M., "Routing in Today's Internetworks," Van Nostrand Rheinhold, pp. 73–74, 1994.

Moy, J., "Multicast Extensions to OSPF," Network Working Group, RFC 1584, Mar. 1994.

The ATM Forum, "ATM User–Network Interface Specification Version 3.1," Sep. 1994.

R. Callon, R. Coltun, J. Drake, J. Feffords, G. Swallow, "A Strawman Proposal for the ATM PNNI Routing Hierarchy," ATM Forum 94–0073, Jan. 1994.

K. Sivarajan, W. Lee, "Issues in the Aggregation of Link State Parameters in Hierarchical PNNI Networks," ATM Forum 94–0646, Jul. 18–24, 1994.

Whay Lee, "A Minimal Spanning Connectivity Method for Link State Aggregation," ATM Forum 94–0673. Jul. 1994.

Ethan A. Speigel, "Representation of Node Parameters Using Exceptions," ATM Forum 94–0907, Sep. 26–29, 1994.

Whay C. Lee, "Some Guidelines for P–NNI Topology Aggregation," ATM Forum 95–0153, Feb. 1995.

Rauf Izmailov et al., "Aggregation of Administrative Weight," ATM Forum 96–0818, Jun. 1995.

The ATM Forum, "ATM Forum 94–0471R16: PNNI Draft Specification (PNNI SWG)," Feb. 1996.

Khalid Ahmad and Todd Morris, "Clarification on use of VPC and Bandwidth Handling for the B–ICI," ATM Forum 94–0676, Jul. 18, 1994.

George C. Sackett and Christopher Y Metz, ATM and Multiprotocol Networking, McGraw–Hill, Chapter 10, pp. 215–228, 1997.

Uyless Black, "ATM Foundation for Broadband Networks," Prentice Hall PTR, pp. 141–142, 208–214, 223–229, 241, 248–249, 1995.

* cited by examiner

DYNAMICALLY CREATED SERVICE CLASS-BASED ROUTING TABLES

The present application is a continuation of and claims priority to U.S. patent application Ser. No. 09/107,038, now U.S. Pat. No. 6,563,798 filed Jun. 29, 1998, entitled DYNAMICALLY CREATED

FIELD OF THE INVENTION

The present invention is related to the creation of structures used for computer network routing tables and, in particular, for PNNI routing tables used in ATM networks.

BACKGROUND

Asynchronous Transfer Mode (ATM) is a connection oriented system. As such, connection requests need to be routed from a requesting node though the ATM network to a destination node. The ATM Forum has defined a private network-to-network or node-to-node interface (PNNI) protocol which allows easier interconnection of ATM switches. The PNNI protocol consists of two components. The first is a signaling protocol used to relay ATM connection requests within a network between a source and a destination. The second is a routing protocol used to determine the path for routing signaling requests though the ATM network. The goal of the PNNI protocol is to advertise enough information between the nodes of a network so as to allow the nodes to route call requests within the network. Ideally, every ATM switch in a network would not only know the address of every ATM attached installation but also the current available composite (VPI/VCI) for new switched virtual circuits (SVCs) to every switch. However, as ATM networks grow to include hundreds or even thousands of switches supporting tens of thousands of users and devices, such an implementation becomes unfeasible.

Nevertheless, finding the shortest or best available path from one point to another across an ATM network does require that each node know something about what the network looks like. For example, each node must know its own whereabouts in the network and be able to locate other nodes or ATM installations so that it can establish virtual circuits offering the appropriate speed and quality of service (QoS) parameters. The solution devised by the ATM Forum is a scheme that distributes and summarizes network topologies so that nodes have detailed information about their local topology and summarized information about more distant regions of the network. The PNNI protocol manages this information through the use of an hierarchical topology, along with an addressing scheme similar to that used in telephony networks.

For each node (e.g., switch) of an ATM network, a PNNI interface associates a connection between two nodes and the connection may be a physical link or a virtual path connection (VPC). In general, every PNNI-capable node has several such interfaces and each is associated with a set of parameter (usually stored in a data structure in memory), including a traffic metrics table that stores the available traffic resource parameters on the link associated with the interface (in the forward direction). These traffic metrics tables are generally two-dimensional and associate service classes with the type of traffic metrics or attributes supported by the connection. In one sense, PNNI is a link state algorithm and QoS-based routing protocol which can collect and advertise these link state parameters (i.e., the attributes and metrics that are associated with each link and node) which become the bases for routing path selections within the network.

Using PNNI, then network nodes are provided with "reachability information" (i.e., based on the traffic metrics and attributes) about other nodes. This reachability information is used by a source node to construct a designated transit list (DTL) that describes a complete route to a destination node. The DTL is inserted into a signaling request which is then transmitted along the path described by the DTL. Thus, using PNNI, a single connection will be set up between the source node and the destination node.

ATM nodes configured to use the PNNI routing protocol advertise the reachability of a particular ATM address over multiple ATM physical links. The various levels of the switching hierarchy established by PNNI, map different segments of the overall ATM network in different degrees of detail. By breaking a large network of ATM switches into smaller domains called peer groups, PNNI allows individual switches to navigate paths through the entire network without requiring them to store an entire map of the network in memory. PNNI organizes nodes into peer groups and nodes within a peer group elect a leader node called a peer group leader. The peer group leader summarizes information about the peer group and presents that information to the next higher level hierarchy and also instantiates a logical group node (LGN) at the next higher level. The LGN represents its own child peer group at the lower level and becomes the peer of other LGNs at its level.

Using PNNI then, nodes in an ATM network automatically form a hierarchy of peer groups according to addresses assigned by a network manager. The nodes' ATM addresses provide the key to the structure of this hierarchy. Each peer group has its own identifier (called a peer group ID), similar to a telephone exchange or area code. For a lower level peer group this ID is similar to an area code and exchange. For a higher peer group, it would be similar to just the area code. Finally, each node within a peer group has a unique address, similar to the way each line in a telephone exchange has a unique number.

Once the PNNI hierarchy is created, peer group leaders are allocated, and routing information is exchanged. Thereafter, the ATM nodes can begin to establish SVCs between various end-stations on the network. Using the PNNI protocol, installations on remote networks can easily establish SVCs across the hierarchy with other end stations and different peer groups.

When a signaling request is received across a user-to-network interface (UNI) by a ingress node, the node will use a shortest path algorithm, such as a Dijkstra calculation, to determine a path to connect the call to the desired destination. This calculation will create a set of DTLs, and each node will have: a full, detailed path within the source node's own peer group; a less detailed path within the parent peer groups; and even less detail on higher level peer groups, terminating in the lowest level peer group which is an ancestor of both the source and the destination nodes. Hence, using PNNI, SVCs can be set up across a network. Once the connection is established, ATM cells are forwarded by simple table lookups, e.g., using connection tables.

As indicated above, the PNNI specification requires that QoS sensitive source routing algorithms be used in the PNNI hierarchical routing environment. QoS sensitive routing implies that the route selection algorithm must determine whether a source route can support all of the QoS requirements of a request. This requires that the routing algorithm consider both link constraints and path constraints. Link constraints such as available bandwidth (AvCR) are relatively easy to deal with because links which do not meet a caller's requirements may simply be dropped or pruned from the topology during the shortest path calculation. However, path constraints such as cell transfer delay (CTD) and cell delay variation (CDV) are more difficult to deal with because they are not dependent on a single link only and, to date, no known routing algorithm is capable of optimizing for multiple path constraints.

Of the known routing algorithms (or shortest path algorithms), on-demand routing has gained some popularity. Indeed, one method of on-demand routing is presented as an appendix to the ATM Forum's PNNI specification. In general, on-demand routing performs a separate route computation for each requested route. On-demand routing according to this method optimizes on a single path constraint while pruning links that do not meet the caller's requirements.

Another routing scheme proposed in the PNNI specification uses pre-computed routes. In this case, sets of paths for each QoS (e.g., constant bit rate (CBR), real-time variable bit rate (rtVBR), non-real-time variable bit rate (nrtVBR), available bit rate (ABR) and unspecified bit rate (UBR)) are pre-calculated by computing the shortest path routes using a single optimization criteria for a single class of service. The routes provided are optimized without considering bandwidth (i.e., so long as a link has >0 bandwidth it is used for the shortest path computation) and the method falls back to on-demand routing every time the search of pre-computed routes fails. In general, the pre-computed routes are stored in linear routing tables. Each routing table is maintained as a shortest path tree (SPT), and each SPT is constructed based on the optimization of a single traffic metric. In other words, each SPT maintains a shortest path tree to each reachable destination node in the same PNNI routing domain based on a single criterion, i.e., a traffic metric.

The use of such conventional routing tables, however, has several undesirable effects. For example, because multiple such tables are required to accommodate all of the various traffic metrics and service classes, a considerable amount of memory is required just to store the tables. Indeed, where all service classes exist in a network, a maximum number of these tables may have to be generated and stored. Further, because known routing algorithms can only optimize on a single constraint at a time, this suggests that any SPT made up of traditional routing tables will contain only those paths optimized for the designated traffic parameter. Yet, other parameters (which were not the subject of the route optimization computation) may also be determinative of whether a given route may be used by a connection request. This further increases the demand for sufficient memory to store the necessary routing tables.

What is desired, therefore, is a method for creating routing table structures for ATM or other networks that avoids the drawbacks of prior schemes.

SUMMARY OF THE INVENTION

The present invention provides a method of dynamically creating routing table structures which may find application as routing tables for ATM or other computer networks. In general, each routing table provides a selection of pre-computed routes optimized to a specified constraint such as delay and delay variation (e.g., as measured by CTD and CDV), or administrative weight (AW). The routing tables may be implemented as shortest path trees, e.g., as may be generated by a Dijkstra process, which represent the computed routes within the network, optimized to a specified constraint for one or more specified network service categories. Thus, the routing tables allow for rapid compilation of one or more source-computed routes (e.g., DTLs in an ATM network). In some cases, the routing tables may include alternate routes between network nodes. By providing these alternate routes in a single routing table structure, the present invention may utilize less storage and processing resources as compared to routing table schemes of the past.

Thus, in one embodiment, routing tables for a computer network may be dynamically created according to traffic metrics advertised for service classes within the network (e.g., one or more additive ATM traffic metrics). Any number of tables, between a minimum of three and a maximum of ten, may be created. The traffic metrics may include administrative weight (AW), cell transfer delay (CTD) and cell delay variation (CDV) and the service classes may include constant bit rate (CBR), real-time variable bit rate (rtVBR), non-real-time variable bit rate (nrtVBR), available bit rate (ABR) and unspecified bit rate (UBR). Each of the routing tables preferably provides a selection of pre-computed routes within the computer network optimized to one of the traffic metrics. The routing tables may be implemented as shortest path trees, each of which represents the pre-computed routes within the computer network optimized to a specified traffic metric for one or more of the service classes. Each shortest path tree may be generated using a Dijkstra process and one or more of the routing tables may include alternate routes between nodes of the computer network. In response to a request for a connection within the network a path may be selected from an appropriate one of the routing tables.

These and other features and advantage provided by the present invention will become apparent from a review of the detailed description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein is a method of dynamically creating routing table structures which may find application as routing tables for ATM or other computer networks. In general, each routing table provides a selection of pre-computed routes optimized to a specified constraint such as delay and delay variation (e.g., as measured by CTD and CDV), or administrative weight (AW). The routing tables may be implemented as shortest path trees, e.g., as may be generated by a Dijkstra process, which represent the computed routes within the network, optimized to a specified constraint for one or more specified network service categories. Thus, the routing tables allow for rapid compilation of one or more source-computed routes (e.g., DTLs in an ATM network). In some cases, the routing tables may include alternate routes between network nodes. By providing these alternate routes in a single routing table structure, the present invention may utilize less storage and processing resources as compared to routing table schemes of the past.

Figure 1:
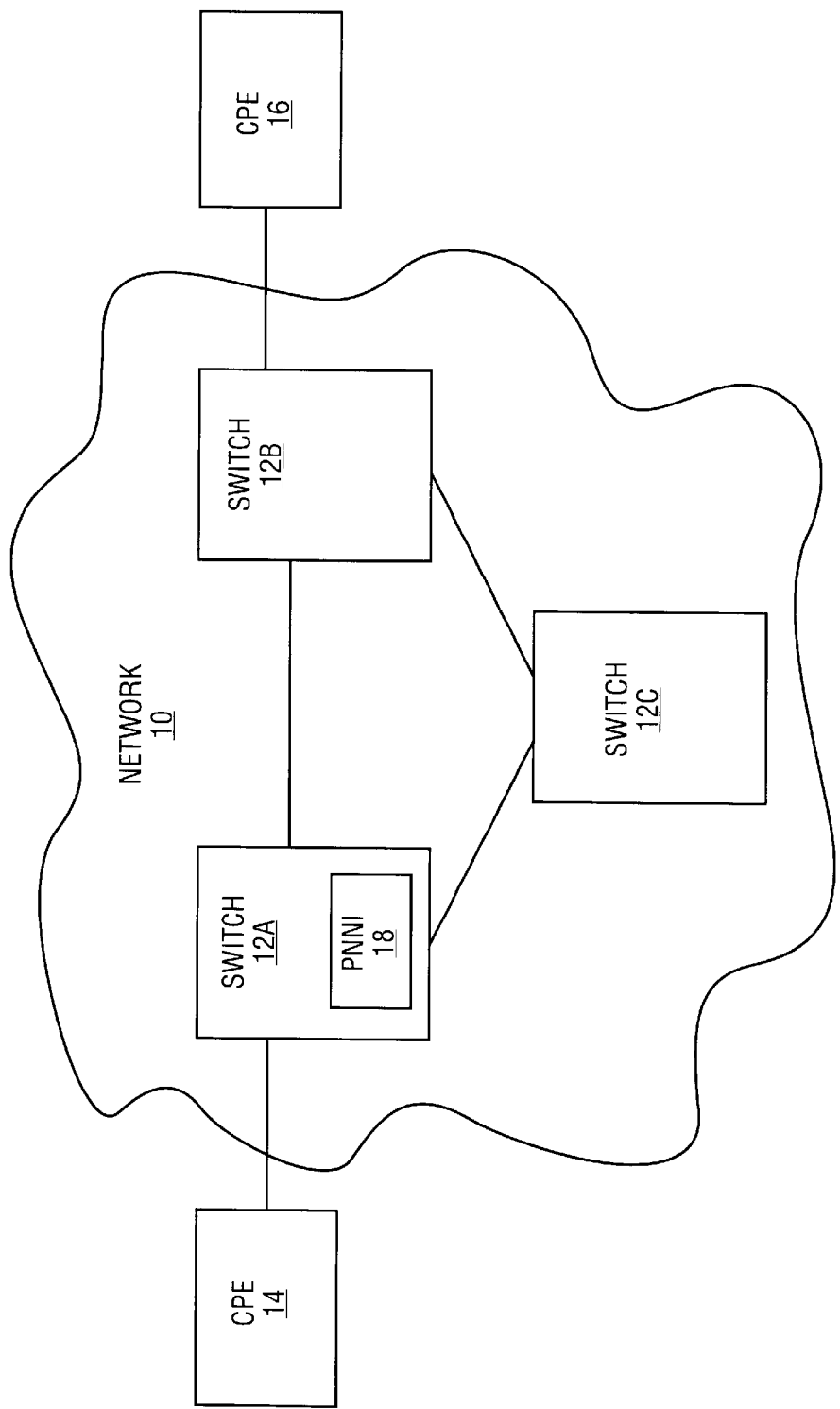
FIG. 1 illustrates an ATM network configured with a routing table structure in accordance with one embodiment of the present invention.

An exemplary call establishment procedure which makes use of routing tables created in accordance with the present invention is shown in FIG. 1. Network 10 is made up of three switches 12a, 12b and 12c. Of course, this is merely an example and, in practice, a network such as an ATM or other cell or packet switched network will be made up of a number of switches. Assume a user at customer premises equipment (CPE) 14 wishes to establish a connection with CPE 16. For example, a remote user at CPE 14 may wish to access a server at CPE 16. A call setup message from CPE 14 is delivered to switch 12a using a switched virtual circuit (SVC). When the signaling request is received, switch 12a will use PNNI routing agent 18 to determine whether a path through network 10 which meets the call request parameters (e.g., QoS, bandwidth, etc.) can be established. If no route can be found, then the call is blocked (cleared). If a path is found, a DTL is created for downstream nodes to follow and forwarded along the route.

To determine whether a path exists that will satisfy the call request, the PNNI routing agent 18 uses pre-computed routing tables (called shortest path trees or SPTs) stored in memory at switch 12a to determine whether such a route can be established. The SPTs are pre-computed using a shortest path algorithm, such as a Dijkstra calculation, to determine a path to CPE 16. This calculation will create a set of DTLs, with at least one DTL to each other network switching node that is reachable from switch 12a (i.e., the local switch). Hence, using the pre-computed quality of service sensitive routes, SVCs can be set up across network 10 to connect CPE 14 to CPE 16. Once the connection is established, ATM cells are exchanged between the source and destination.

PNNI routing agent 18 is a relatively independent process within switch 12a and its main function is to create a routing database to be used by a connection manager within switch 12a for SVC connection requests. The routing agent 18 thus provides an interface between the PNNI protocol and the connection manager. As indicated above, when the routing agent 18 is invoked for a route request, it searches pre-calculated routing databases for the given destination along with the requested service class and traffic metric parameters. If there exists a satisfactory route, the associated DTL is returned as a response. If for some reason a downstream node rejects the call request (crankback), then the routing agent 18 of the source node provides an alternate route, if any, that does not include the cranked back node(s) and/or link(s).

Figure 2:
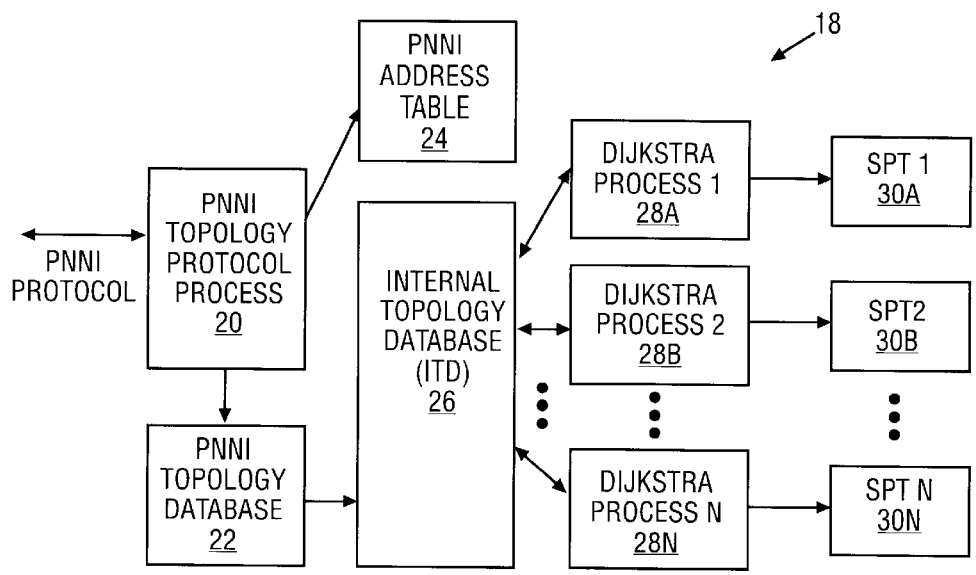
FIG. 2 illustrates a PNNI routing agent configured according to one embodiment of the present invention.

One exemplary embodiment of the PNNI routing agent 18 is shown in more detail in FIG. 2. As a result of the operation of the conventional PNNI topology protocol process 20, a PNNI topology database 22 is created and maintained at switch 12a (e.g., in memory). As indicated above, PNNI uses a reliable flooding mechanism to exchange topology information with other PNNI nodes (e.g., switches) in the same peer group. Thus, a PNNI topology or PTSE (PNNI topology state elements) database is maintained which stores the information received (and to be transmitted) during the flooding process. The PNNI topology database contains the topology information, along with all of the QoS-based traffic parameters that are associated with each link and node of the entire peer group as well as those fed down from higher levels in the network hierarchy. For this embodiment then, each PTSE in the topology database 22 is formatted to resemble a PNNI PTSE to make it more convenient for the flooding procedure.

Also as described above, each PNNI node has a default address. Additional addresses can be obtained via local and network management operations. These addresses are stored in a PNNI address table 24 and may also be used to originate associated PTSEs by the local node (e.g., switch 12a) and flooded to the peer group. The address table 24 thus stores all reachable addresses along with the node(s) via which they can be reached. Addresses so stored are used during a route search as discussed below.

An internal topology database (ITD) 26 is created for use as an input for the various Dijkstra processes 28a–28n. The Dijkstra processes 28a–28n are used to calculate the shortest path routes for the specified network constraints. There is a separate Dijkstra process 28 for each predefined constraint, and each Dijkstra process 28 will generate its own SPT 30. Thus, multiple SPTs 30a–30n are maintained as outputs from the Dijkstra processes 28a–28n, with all SPT 30a–30n optimized on a specified constraint (e.g., a delay- or cost-based constraint). Each SPT 30a–30n describes the shortest path from the local node (e.g., switch 12a) to all other nodes for its respective constraint.

Each Dijkstra process 28a–28n may be executed, and the corresponding SPT 30a–30n regenerated, upon a significant triggering event. Triggering events correspond to changes in the PNNI topology database 22, thus upon such events the associated SPT 30a–30n need to be updated to reflect the change in network topology. Significant triggering events may include topology changes such as the addition or removal of a link or switch or significant link state parameter changes on a link or for a complex node.

When a route request is received, the address table 24 is consulted to see if the destination node's address is present. If the destination node is found, it is noted and located in one or more of the associated SPTs 30a–30n, according to the requested bandwidth and other requirements. An SPT is chosen from among the available options (if more than one exists) and a DTL stack can then be derived. In one embodiment, this is accomplished by traversing the chosen SPT from the destination node to the source node. Such traversal is possible because the SPTs 30a–30n are organized as spanning trees and not as traditional linear tables. This structure is described in further detail in co-pending application Ser. No. 09/069,069, entitled "Routing Table Structures", filed Apr. 28, 1998, by Dean Cheng, assigned to the Assignee of the present invention and incorporated herein by reference. Each SPT 30a–30n may maintain multiple equal-cost paths, if any, and a number of equal-cost paths may be considered per SPT. Paths are considered as equal cost if the difference between their accumulated values on a specific constraint is less than or equal to a specified tolerance range.

Notice then that the present routing scheme eschews the use of traditional routing tables. No routing tables are actually generated. Instead, routing tables exist only logically. The route search involves a lookup in the address table 24 first, followed by a read of the pre-calculated SPTs 30a–30n by tracing from destination node to local node. There is a significant amount of time and memory saved (e.g., compared to routing schemes of the past) by not generating traditional routing tables.

Figure 3:
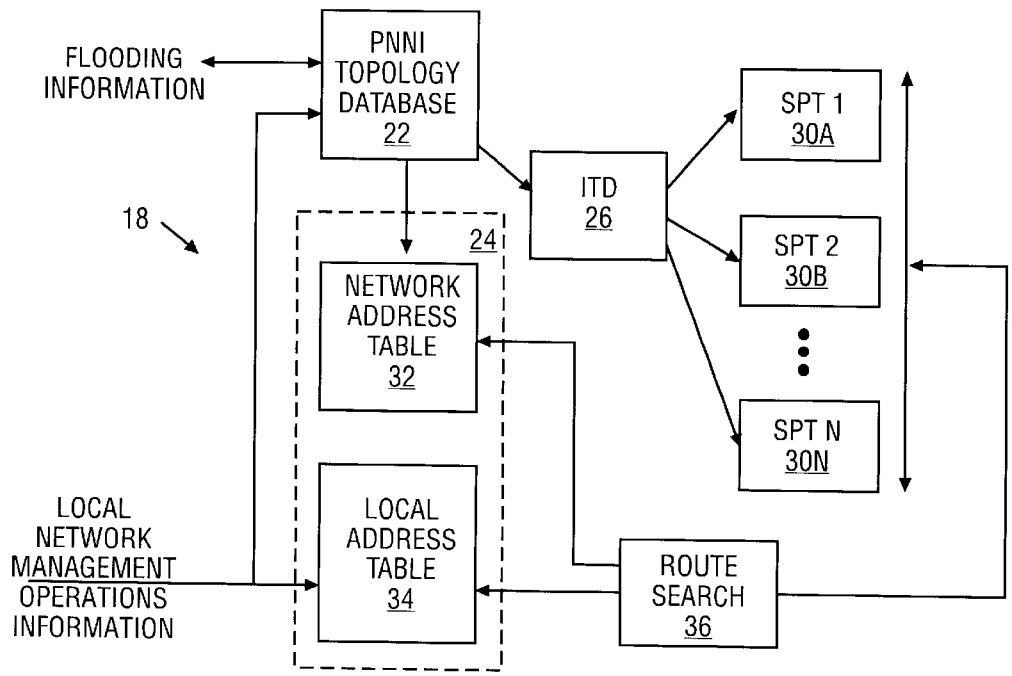
FIG. 3 illustrates a functional diagram for a PNNI routing agent's major data structures and interfaces according to one embodiment of the present invention.

FIG. 3 illustrates a functional diagram for PNNI routing agent 18 according to one embodiment of the present invention. PNNI topology database 22 is shown as being capable of receiving flooding information to allow for the exchange of topology information with other PNNI nodes in the same peer group. The address table 24 may be divided into a network address table 32 and a local address table 34. Locally obtained addresses are stored in the local address table 34 and, as indicated above, may also be used to originate associated PTSEs by the local node and flooded to the peer group. Addresses learned from the network are retrieved from the topology database 22 and stored in the network address table 32 for fast address searching during route searching. The local address table 34 may be used to route a local SVC call, i.e., local switching to a locally attached link or to forward a call from another node. For non-local switching calls, the network address table 32 is searched to find the destination node which advertises the associated address, and, if the destination node is found, one or mode SPTs 30a–30n may be searched using the route search routine 36 to find the path which meets the SVC call requirements to that destination node.

There are three scenarios for a route search. First, if the destination address finds a match in the local address table 34, the SVC call is forwarded to a local port at the source switch. Second, if there is a match in the network address table 34, the PNNI destination node is identified, a search in one or more of the SPTs 30a–30n is performed and, if a route is found, a DTL stack is constructed and the call is forwarded. Third, if no route is found, the call is blocked.

To more fully appreciate the present invention, it is helpful to understand the relationships between various topology metrics and attributes. It is these metrics and attributes which are collected and advertised by the PNNI routing protocol (e.g., during the flooding process referred to above) and which form constraints on links, nodes and paths within a network. Thus, it is these metrics and attributes which form the basis for dynamic routing table generation.

Table 1 below lists the correlation between service classes and traffic metrics/attributes. Notice that all the metrics/attributes may be specified on the basis of service classes. Where a metric/attribute is designated as "required", this means that the metric/attribute must be specified for the associated service class. "Optional" indicates that the metric/attribute may be specified for the associated service class, and "n/a" indicates that the metric/attribute is not applicable for the associated service class.

TABLE 1

| service class metric/attribute | CBR | rtVBR | nrtVBR | ABR | VBR |
| --- | --- | --- | --- | --- | --- |
| AW | required | required | required | required | required |
| maxCR | optional | optional | optional | required | required |
| AvCR | required | required | required | required | n/a |
| maxCTD | required | required | required | n/a | n/a |
| CDV | required | required | n/a | n/a | n/a |
| $CLR_0$ | required | required | required | n/a | n/a |
| $CLR_{0+1}$ | required | required | required | n/a | n/a |
| CRM | n/a | optional | optional | n/a | n/a |
| VF | n/a | optional | optional | n/a | n/a |

The traffic metrics/attributes are defined as follows:

Administrative weight (AW) is a value assigned to indicate the relative desirability of using a link or node. It is a dimensionless quantity. AW is additive and can be aggregated during path selection in the Dijkstra calculation. If set to 1 on every link, the accumulated value becomes a hop count. In some embodiments, there may be a single AW configured per interface for all service classes. In other embodiments, AW may be measured for one or more different service classes.

Cell delay variation (CDV) describes the variability in a pattern of cell arrival events observed at a measurement point. More specifically, CDV is the (1−a) quantile of the CTD, minus the fixed CTD that could be experienced by any delivered cell on a connection during the entire connection holding time, measured in microseconds. Note that, the ATM Forum defines CTD (cell transfer delay) as a measure of the elapsed time between a cell exit event (i.e., the time at which the first bit of an ATM cell has completed transmission out of an end-system or ATM network element to a public or private ATM network element across a UNI measurement point) at a first measurement point (e.g., a source UNI) and the corresponding cell entry event (i.e., the time at which the last bit of an ATM cell has completed transmission into an end-system or ATM network element from a public or private ATM network element across a UNI measurement point) at a second measurement point (e.g., a destination UNI) for a particular connection. Thus, the CTD between two measurement points is the sum of the total inter-ATM node transmission delay and the total ATM node processing delay between the two measurement points. See, e.g., ATM Forum, *Traffic Management Specification* v4.0 (1996).

CDV is additive and can be accumulated during path selection in the Dijkstra calculation. In some embodiments, CDV may be statically configured on per-trunk basis, e.g., based on queuing delay. In such cases, one CDV value may be used for all supported service classes. In other embodiments, CDV may be a measured value, e.g., using OAM cells. In such cases, CDVs could be measured separately for different service classes, and these different values used in the shortest path computations.

For purposes of the present invention, maxCTD may be regarded as the sum of all fixed delay components across a link or node and CDV, measured in microseconds. The quantity is additive and can be accumulated during the Dijkstra calculation. In one embodiment, maxCTD may be statically configured on s per-trunk basis, e.g., based on distance traversed by a link. In other embodiments, maxCTD may be measured for one or more service classes and the resulting values used for the shortest path computations.

Maximum cell rate (maxCR) may be regarded as the maximum capacity usable by PNNI for SVCs belonging to the specified service category, measured in cells per second. In some embodiments, a single maxCR may be used for all service classes, however, in other embodiments, different values of maxCR may be used for different service classes.

Available cell rate (AvCR) is a measure of effective available capacity for CBR and VBR services and a measure of capacity available for minimum cell rate reservation, measured in cells per sec. A single AvCR may be used for all service classes or, alternatively, separate values may be used for different service classes.

Cell loss ratio ($CLR_0$) is the maximum cell loss ratio for $CLP_0$ traffic (i.e., cells with a CLP bit set to 0) over a link or node. In some embodiments, this value may be statically configured for all applicable service classes. In other embodiments, separate values may be used for different service classes.

Cell loss ratio ($CLR_{0+1}$) is the maximum cell loss ratio for $CLP_{0+1}$ traffic (i.e., cells with a CLP bit set to 1) over a link or node. In some embodiments, this value may be statically configured for all applicable service classes.

Cell rate margin (CRM) is a measure of the difference between the effective bandwidth allocation and the allocation for sustainable cell rates, in cells per second. Again, this may be a statically configured or a measured value.

Variation factor (VF) is a relative measure of the square of the cell rate margin normalized by the variance of the sum of the cell rates of all existing connections. In some embodiments, this value may be statically configured for all applicable service classes. In other embodiments, it may be measured for different service classes.

To summarize, the traffic metrics (AW, CDV and CTD) are additive and may be used for shortest path computations in a Dijkstra calculation when a QoS-based routing path, i.e., one which is optimized on a given traffic metric for a given class of service, is computed. The traffic attributes (maxCR, AvCR, CLR0, $CLR_{0+1}$, VF and CRM) are not additive and, therefor, are not used as optimization criteria for the Dijkstra calculations. In the present invention then, a routing table is a combined set of DTLs, where each DTL describes an optimal routing path from the calculating node (i.e., the node where the table is computed) to a given destination node. More particularly, the present invention makes use of two strategies for route calculation (i.e., for creation of the SPTs 30a–30n): cost-based or delay-based. If cost-based routing is used, the SPT's constraint is AW, if delay-based routing is used, the SPT's constraint is CTD or CDV.

For the illustrated embodiment then, the Dijkstra algorithm is used to pre-calculate routes from the local node to each reachable destination node. The number of pre-calculated routing tables depends on the number of combinations of service class-based PTSEs that a node generates and receives from the network as part of the flooding process. For example, the minimum number of routing tables which would be generated is three, where each of the traffic parameters is identical for all applicable classes of service with the associated link or node in the routing domain. In one embodiment, this is a default condition and the three tables generated are: (a) one table optimized on AW for all service classes, (b) one table optimized on CTD for CBR, rtVBR and nrtVBR service classes, and (c) one table optimized on CDV for CBR and rtVBR service classes.

When the calculating node (i.e., the node which is generating the routing tables) generates or receives service class-based traffic metrics the previously computed tables split accordingly and new routing tables are generated. This may occur up to the generation of any number from 3 to 10, inclusively, of routing tables where 10 is the maximum number as follows:

1. a table optimized on AW for CBR;
2. a table optimized on AW for rtVBR;
3. a table optimized on AW for nrtVBR;
4. a table optimized on AW for UBR;
5. a table optimized on AW for ABR;
6. a table optimized on CTD for CBR;
7. a table optimized on CTD for rtVBR;
8. a table optimized on CTD for nrtVBR;
9. a table optimized on CDV for CBR; and
10. a table optimized on CDV for rtVBR.

Note the correspondence between the required routing tables and the required traffic metrics per service class as shown in Table 1. Of course, any number of tables between the default value of 3 and the maximum number of 10 may be generated according to the service classed-based traffic metrics which are being advertised by the local node and the network (e.g., if AW is common for all service classes, but the other traffic metrics are not, then only a single table optimized on AW is required in addition to two tables optimized on CDV and three tables optimized on CTD, etc.). By only generating the number of tables actually required to support the current network configuration (i.e., the current traffic metrics associated with the available service classes), the present scheme may significantly reduce the requirement for memory storage space, as well as the CPU processing resources, space for the tables as compared to routing table schemes of the past.

In each case, each SPT 30a–30n may be created using a single Dijkstra process 28 optimized to the specified constraint (i.e., traffic metric). Alternatively, a set of Dijkstra processes 28a–28n may be used to create SPTs 30a–30n for each specified constraint. The input for the Dijkstra processes 28a–28n is the PNNI topology database, which, in order to benefit execution speed, may be reformatted to a separate memory space as ITD 26. The individual constraints used by each Dijkstra process 28a–28n are configurable parameters.

In one embodiment, the output of each Dijkstra calculation is an SPT with its root at the local node and branches spanning outward towards all other nodes. Each SPT may accommodate multiple paths to the same destination. A configurable tolerance value for the accumulated cost is used by the Dijkstra calculation. Paths are considered equal-cost if the difference between their accumulated values are within the tolerance. All (or some) equal-cost paths are maintained in a single SPT. The equal-cost tolerance is configurable on a per node basis. The setting of this value will control the number of alternate routes contained in each SPT 30a–30n. A small value will result in fewer alternate routes than a large value. In this way, a network administrator can trade off setup time and SPT size with the ability to balance loads across paths with similar QoS characteristics.

As indicated above, within an SPT, a selection of alternate equal-cost paths may be provided. This makes it possible to share loads between paths with equal cost. When an SPT provides multiple equal-cost paths as determined by the equal-cost tolerance parameter, a path may be chosen from the selection at random. A random choice is used because, in the absence of valid link state information, which is the case when many connections are being routed over the same path in a short time, a random choice has been found to distribute the load better than a choice based on stale link state information. Of course, other equal-cost path selection processes could be used.

The use of pre-computed routing tables tends to speed up (e.g., over on-demand routing schemes) the call processing at the calculating node (i.e., the node operating on switch 72). As indicated, each table contains a set of DTLs which lead to all the other nodes of the network. The routing paths contained in a given routing table are optimized on a single additive traffic metric and for a given service category. Note, sometimes a single table contains paths which are optimized for multiple service categories, for example where all the traffic parameters are the same for the associated service categories. In such cases, the number of required routing tables can be reduced.

Thus, a method of dynamically creating routing table structures which provides quality of service sensitive routes in pre-computed in a shortest path trees has been described. As discussed above, in one exemplary embodiment, the present invention computes routes for a cell or packet switched network by first selecting an optimization function or constraint for a shortest path computation and then computing available routes (in the form of SPTs) using the selected optimization function or constraint. These results can then be searched upon receipt of a call request and, if available, a pre-computed route provided therefrom. Although discussed with reference to specific illustrated embodiments, the generality of present invention should not be limited thereby. Instead, the present invention should only be measured in terms of the claims which follow.

What is claimed is:

1. An apparatus comprising:
   circuitry to dynamically create routing tables for a switch within a computer network according to traffic metrics advertised for service classes within the computer network,
   wherein each of the routing tables provides a selection of pre-computed routes within the computer network optimized to one of the traffic metrics, and
   wherein each of the routing tables comprises a shortest path tree which represents the pre-computed routes within the computer network optimized to a specified traffic metric for one or more of the service classes.

2. The apparatus of claim 1, wherein a minimum of three routing tables are created.

3. The apparatus of claim 2, wherein a maximum of ten routing tables are created.

4. The apparatus of claim 1, wherein the traffic metrics include administrative weight (AW), cell transfer delay (CTD), and cell delay variation (CDV).

5. The apparatus of claim 4, wherein the service classes include constant-bit rate (CBR), real-time variable bit rate (rtVBR), non-real time variable bit rate (nrtVBR), available bit rate (ABR), and unspecified bit rate (UBR).

6. The apparatus of claim 1, wherein each shortest path tree is generated using a Dijkstra process.

7. The apparatus of claim 1, wherein one or more of the routing tables includes alternate routes between nodes of the computer network.

8. An apparatus comprising:
   circuitry to dynamically generate routing tables for a network switch according to one or more additive asynchronous transfer mode (ATM) traffic metrics advertised for service classes supported by an ATM network, wherein each of the routing tables comprises a shortest path tree which represents pre-computed routes within the ATM network optimized to a specified ATM traffic metric for one or more of the service classes; and
   circuitry to select a path from one of the routing tables in response to a request for a connection within the ATM network.

9. The apparatus of claim 8, wherein the ATM traffic metrics include cell delay variation (CDV).

10. The apparatus of claim 9, wherein the ATM traffic metrics further include administrative weight (AW).

11. The apparatus of claim 8, wherein the ATM traffic metrics include a function of the relative desirability of using a link or node within the computer network.

12. The apparatus of claim 9, wherein the ATM traffic metrics further include cell transfer delay (CTD).

13. The apparatus of claim 8, wherein the routing tables are regenerated upon a change in the ATM traffic metrics advertised for the service classes.

14. An apparatus comprising:
   means for dynamically creating routing tables for a switch of a computer network according to traffic metrics advertised for service classes within the computer network,
   wherein each of the routing tables provides a selection of pre-computed routes within the computer network optimized to one of the traffic metrics, and
   wherein each of the routing tables comprises a shortest path tree which represents the pre-computed routes within the computer network optimized to a specified traffic metric for one or more of the service classes.

15. The apparatus of claim 14, wherein a minimum of three routing tables are created.

16. The apparatus of claim 15, wherein a maximum of ten routing tables are created.

17. The apparatus of claim 14, wherein the traffic metrics include administrative weight (AW), cell transfer delay (CTD), and cell delay variation (CDV).

18. The apparatus of claim 17, wherein the service classes include constant-bit rate (CBR), real-time variable bit rate (rtVBR), non-real time variable bit rate (nrtVBR), available bit rate (ABR) and unspecified bit rate (UBR).

19. The apparatus of claim 14, wherein each shortest path tree is generated using a Dijkstra process.

20. The apparatus of claim 14, wherein one or more of the routing tables includes alternate routes between nodes of the computer network.

21. An apparatus comprising:
   means for dynamically generating routing tables for a network switch according to one or more additive asynchronous transfer mode (ATM) traffic metrics advertised for service classes supported by an ATM network, wherein each of the routing tables comprises a shortest path tree which represents pre-computed routes within the ATM network optimized to a specified ATM traffic metric for one or more of the service classes; and
   means for selecting a path from one of the routing tables in response to a request for a connection within the ATM network.

22. The apparatus of claim 21, wherein the ATM traffic metrics include cell delay variation (CDV).

23. The apparatus of claim 22, wherein the ATM traffic metrics further include administrative weight (AW).

24. The apparatus of claim 21, wherein the ATM traffic metrics include a function of the relative desirabilty of using a link or node within the computer network.

25. The apparatus of claim 22, wherein the ATM traffic metrics further include cell transfer delay (CTD).

26. The apparatus of claim 21, wherein the routing tables are regenerated upon a change in the ATM traffic metrics advised for the service classes.

* * * * *